United States Patent
Oldenkamp et al.

[15] 3,648,382
[45] Mar. 14, 1972

[54] FREEZE DRYING SOLIDS BEARING LIQUIDS

[72] Inventors: Henry A. Oldenkamp; Clyde D. Watson, both of San Jose, Calif.

[73] Assignee: FMC Corporation, San Jose, Calif.

[22] Filed: Sept. 3, 1970

[21] Appl. No.: 78,319

Related U.S. Application Data

[62] Division of Ser. No. 668,109, Sept. 15, 1967, Pat. No. 3,556,818.

[52] U.S. Cl. ............................................................34/92
[51] Int. Cl. ........................................................F26b 5/04
[58] Field of Search ..............................34/5, 92; 241/24, 69

[56] References Cited

UNITED STATES PATENTS

| | | | |
|---|---|---|---|
| 3,324,565 | 6/1967 | Smith, Jr. | 34/5 |
| 3,132,930 | 5/1964 | Abbott et al. | 34/5 X |

Primary Examiner—Frederick L. Matteson
Assistant Examiner—W. C. Anderson
Attorney—F. W. Anderson and C. E. Tripp

[57] ABSTRACT

Freeze dried coffee extract is prepared by grinding frozen chunks of extract into particles of varying size, spreading the ground particles into trays so that the fines are at the bottom, and freeze drying the bed of particles in the trays.

4 Claims, 6 Drawing Figures

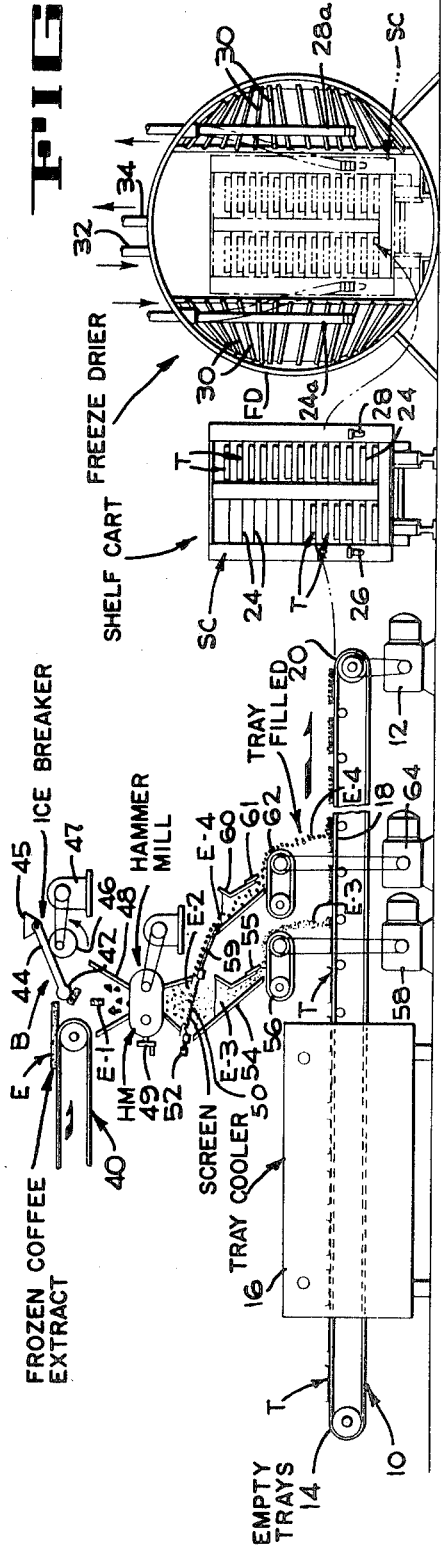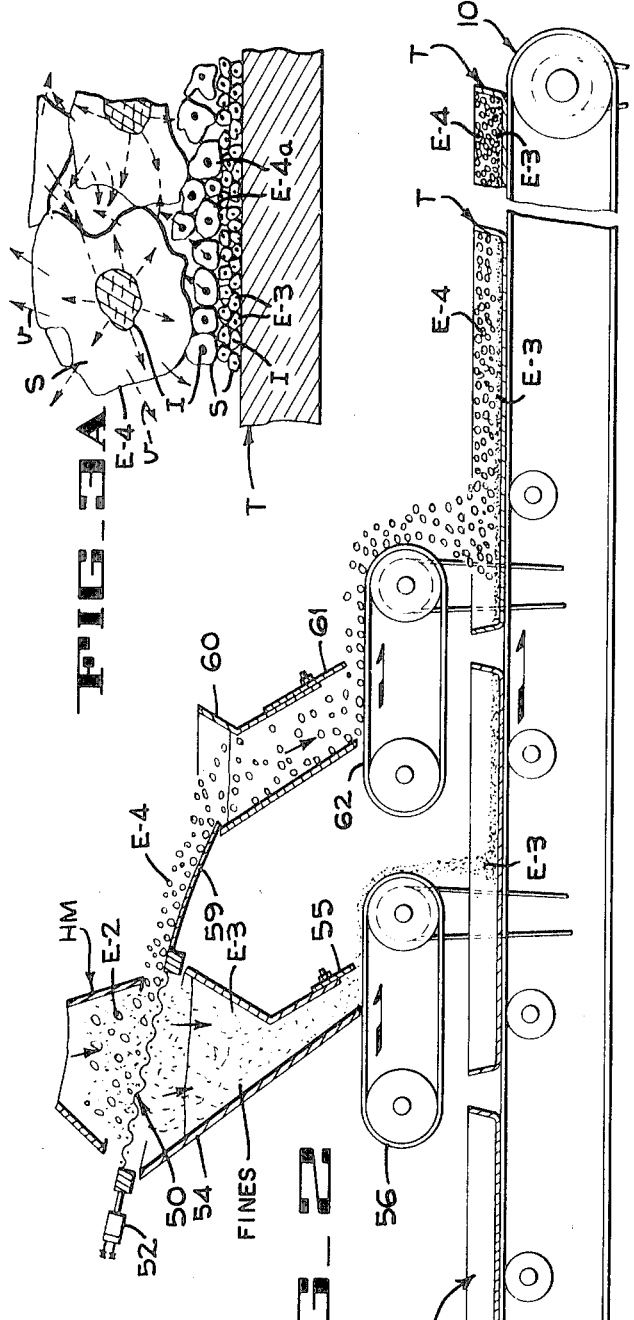

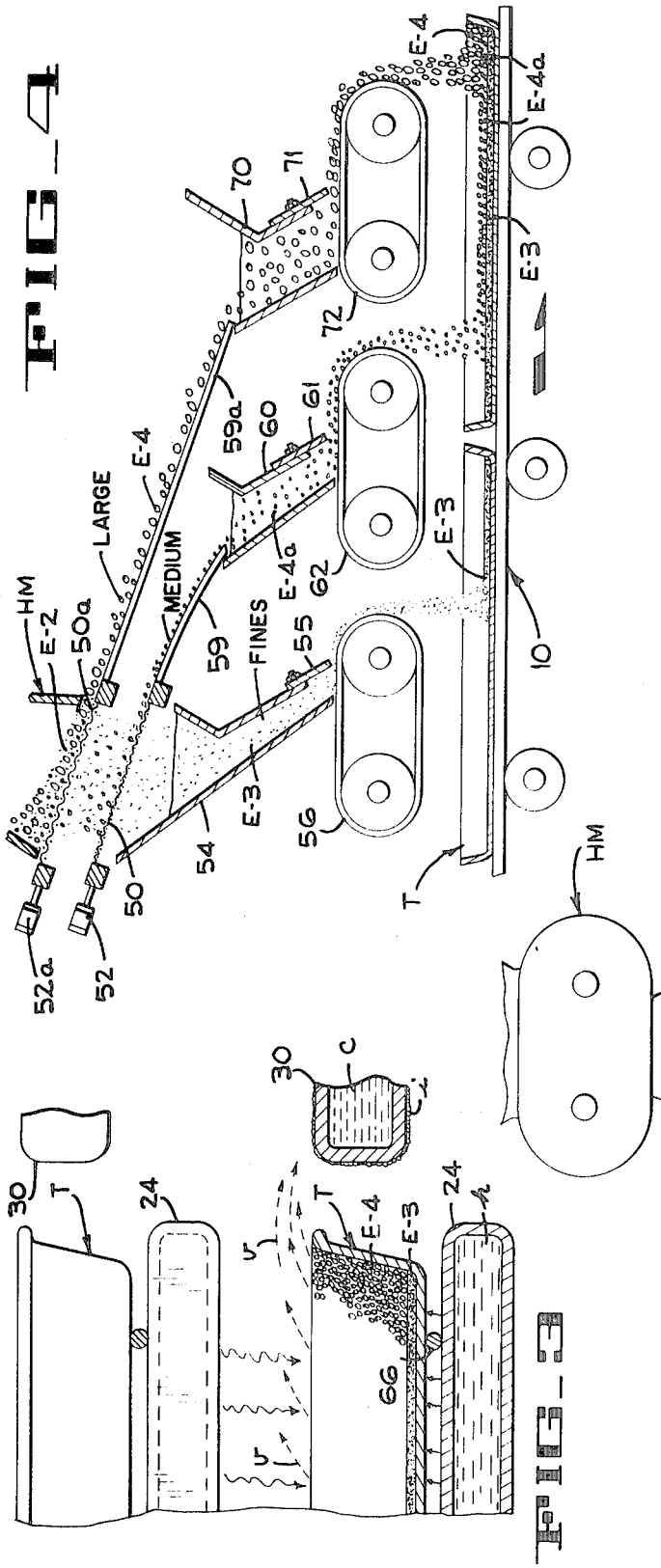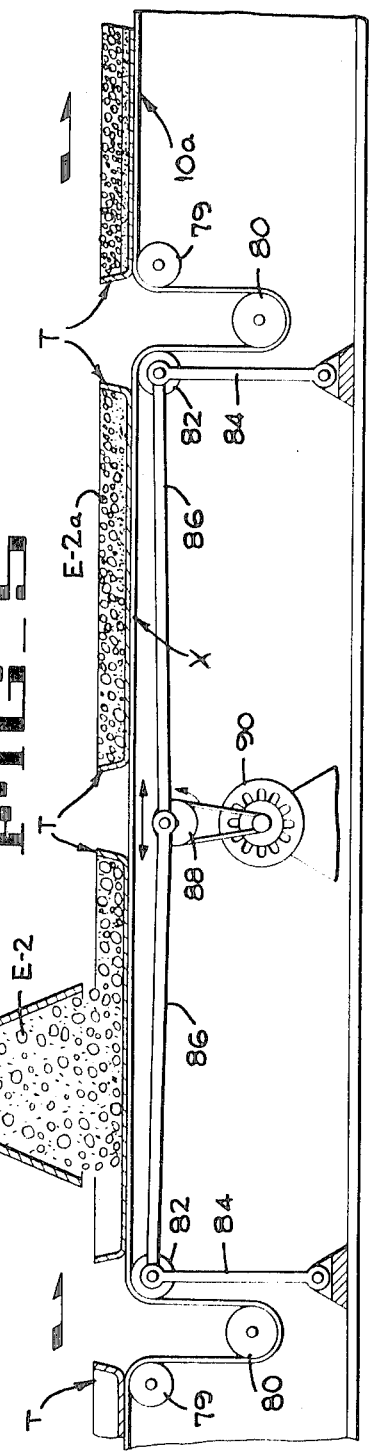

FREEZE DRYING SOLIDS BEARING LIQUIDS

This is a division of application Ser. No. 668,109, filed Sept. 15, 1967, now U.S. Pat. No. 3,556,818.

BACKGROUND OF THE INVENTION

1. Field of the Invention

The present invention is a process for producing dried solids from solids-bearing liquids such as egg, orange juices, coffee extract, etc. The invention is particularly advantageous in the production of a freeze dried coffee extract to produce a product having the general appearance, color and aroma of roasted and ground coffee, and will thus be described.

2. Description of Prior Art

Heretofore, coffee extract has been formed into frozen pellets and the pellets freeze dried, as in Colton U.S. Pat. No. 2,751,687. (The term "freeze drying" is understood to be the drying of a frozen product by sublimation.) However, the freeze dried pellets do not have the general appearance and color of roasted and ground coffee.

It has also been proposed to grind or comminute frozen aromatic products (e.g., British Pat. No. 948,517) and freeze dry the granules. This provides granules having the desired appearance, but in the case of coffee extract this process results in an unacceptable loss in the value of the fines.

In the preparation of freeze dried coffee from comminuted frozen extract, it has been found that fines which will pass through an 80 mesh U.S. standard screen have undesirable properties and characteristics when subjected to freeze drying. This can be explained briefly as follows:

a. Due to their disparate size, the fines lose their ice cores early in the drying cycle.
b. This premature drying causes scorching and aroma loss in the dried fines, unless the heat input is reduced during drying far below a commercially acceptable level.
c. Premature drying also renders the fines too light in color.
d. The fines thus prematurely dried are water vapor-entrained into the voids between the larger particles. The fines thus disposed interfere with diffusion and flow of water vapor out from the ice cores of the larger particles.
e. The fines also are so light in weight that they are carried by the vapor to condensers and parts of the vacuum chamber, which represents a loss of yield.
f. Such vapor diffusion interference by the fines increases the vapor pressure at the larger particles, retards their drying, and might even induce their melting.
g. These prematurely dried, light colored and aroma-deficient fines represent an economic loss.

SUMMARY OF THE INVENTION

It has been found that in the coffee industry as presently constituted, it is desirable that the final freeze dried product contain no more than 3 percent by weight of fines that will pass through an 80 mesh U.S. standard screen, and which are light in color and aroma-deficient, as explained above.

Under the present invention this standard is met by processing the frozen material before drying so that a bed of frozen particles is formed wherein the fines are at the bottom of the bed. This processing is preferably accomplished by screening the frozen and ground articles into at least two factions, one faction constituting a layer of fines which will pass through an 80 mesh screen. These 80 mesh fines are spread as a bottom layer on precooled trays, whereupon the coarser frozen particles are spread over the bottom layer of frozen fines.

The trays filled with this multilayered bed of particles are placed in a freeze drying chamber. The upper strata of the bed (the coarser particles) receive the heat of sublimation by direct radiation. The lowermost stratum of the bed (the fines) receive the heat of sublimation via the trays. As a result the surrounding pressure in the layer of fines is greater than that in the voids between the larger particles. This retards drying of the fines relative to drying of the larger particles, so that ice cores remain in substantially all of the particles, fine and coarse, during a large part of the sublimation-drying cycle. When the disparate size particles are dried under these conditions, the undesirable properties and characteristics a–g explained above are either lacking or significantly improved. Thus, under the present invention, freeze dried coffee meeting present commercial standards as to color, aroma and the presence of undesirable fines can be readily provided.

Other embodiments of the invention as applied to coffee extract, include a double screening, using a 40 mesh screen as well as an 80 mesh screen. This divides the conglomeration of comminuted frozen coffee extract particles into three fractions, and these are spread on trays with the 80 mesh fines forming the bottom layer, the 40 mesh particles forming the intermediate layer, and those particles which will not pass through a 40 mesh screen forming the upper layer.

In another embodiment, the frozen and ground material is deposited and spread on the trays in their as ground condition. The trays thus loaded are shaken or vibrated, either during spreading, after spreading, or both. This brings the fines to the bottom of the bed, so that the features of the invention previously described are attainable upon freeze drying the material thus processed.

BRIEF DESCRIPTION OF THE DRAWINGS

FIG. 1 is a schematic diagram of systems embodying the invention for making freeze dried coffee from extract.

FIG. 2 is an enlarged section of the spreading portion of the system.

FIG. 3 is a still further enlarged, fragmentary section of the interior of the freeze drying chamber.

FIG. 3A is a highly schematic diagram of the drying action, at about 10 X enlargement.

FIG. 4 is a view like that of FIG. 2, showing a modified form of screening and spreading systems.

FIG. 5 shows an embodiment wherein the particles are shaken in the trays.

DETAILED DESCRIPTION

FIG. 1 is a schematic diagram illustrating a system suitable for carrying out the process of freeze drying coffee extract of the present invention. As stated, the invention has other applications, but will be described as a preferred method of processing coffee extract.

The frozen coffee extract E is broken up into chunks E–1 by an ice breaker B. The chunks E–1 pass through a hammer mill HM, which comminutes them into multi-sized particles E–2. The as ground particles E–2 are screened at 50 to separate fines E–3 from the coarser particles E–4, and both grades particles are distributed by a tray filler mechanism onto trays T. The trays will have been cooled to a temperature below the eutectic point of the frozen coffee extract (minus 15° F or lower) by a tray cooler 16, so as to preclude melting of the frozen particles.

The filled trays are transferred to a shelf cart SC, having hollow shelves which can be heated by a circulating liquid, such as the shelf cart described in the U.S. Pat. of Abbott et al. No. 3,132,930, the disclosure of which is incorporated herein by reference. When the shelf cart has been loaded with filled trays, the shelf cart is placed in the freeze drying chamber FD, which may also be like that of the aforesaid Abbott et al. patent, although its details are not critical to the invention. The door to the freeze drying chamber (not shown) is closed and a system set in operation for sublimation-drying the frozen coffee extract grounds, in accordance with principles outlined in the Abbott et al. patent.

The system outlined above will now be described in more detail, with reference to both FIGS. 1 and 2, followed by a brief discussion of how the system attains the advantages of the invention heretofore described.

Reverting back to the handling of the trays T, a tray filler conveyor 10 of the endless belt type is driven by a variable speed gearmotor 12, or any equivalent device, the details of which are not critical to the present invention, as is the case with the variable speed drives of other units to be described. These drives are of conventional design, having the function of driving their respective units at selected speeds which can be correlated one to the other, to cause uninterrupted flow of material through the tray filling system.

The empty trays T are loaded on the conveyor 10 at a loading zone indicated at 14, after which they pass through the tray cooler previously mentioned, and shown as a refrigerated tunnel 16. Coolers of this type are known in the art and hence their details are not critical to the present invention.

As mentioned, in the tray cooler 16, the trays will be cooled down to a temperature below the eutectic point of the coffee extract, which may be in the order of minus 15° F. or lower. This precludes softening or partial melting of the frozen extract when it is spread upon the trays.

The cooled trays T then pass through the tray filler at a filling zone 18 along the conveyor 10. Here, the fines E-3 are uniformly spread along the bottom of the trays, after which the coarser granules E-4 are uniformly spread in a layer on top of the layer of fines E-3. The trays thus filled are removed from the conveyor 10 at an unloading zone 20, either manually or mechanically, and are positioned within the shelf cart SC, as previously mentioned. The shelf cart SC is formed of a tier of hollow shelves 24 through which shelves are circulated a liquid, such as ethylene glycol, that is heated externally of the shelf cart, for supplying the heat of sublimation to the product in the trays.

In order to circulate heating liquid through the shelves 24, couplings 26, 28 are provided which connect to piping structure, a pump, a heater, etc. that forms a source of heated liquid for circulation through the hollow shelves 24. Reference is again made to the Abbott et al. patent, for details of this structure, such details not being critical to the present invention.

When a shelf cart has been loaded with filled trays T containing the layers of granulated product E-3, E-4, the shelf cart is wheeled into the drying chamber FD, the shelf cart fitting closely between opposed tiers of hollow condenser plates 30. By piping constructions disclosed in the Abbott et al. patent in detail, refrigerating liquid (such as freon or ammonia) is circulated through the hollow condenser plates 30 by inlet and outlet pipes 32, 34 connected into a liquid refrigerating system.

At the entry end of the freeze drying chamber FD, are flexible hoses 24a, 28a having quick detachable connectors at their ends for coupling with the hollow shelf couplings 24, 28 of the shelf cart, so that heating liquid can also be circulated through the hollow shelves during freeze drying, in order to supply the heat of sublimation. The usual vacuum connections (not shown) are also made with the freeze drying chamber FD, in order to remove noncondensable gases so that the pressure within the drying chamber during the drying cycle can be held to 300 microns of Hg or less during the majority of the drying cycle.

Additional details of tray filler and associated elements will now be described in connection with FIGS. 1 and 2. The frozen coffee extract E is brought into the system by means of a conveyor 40. In the illustrated system, the coffee extract is introduced in the form of slabs, which may be formed by freezing the extract on freezing belts or on trays, it being understood that the manner in which the extract is frozen and introduced into the system is not critical to the present invention. When the extract is introduced into the system in the form of slabs E, and as previously mentioned, the slabs are broken into large chunks E-1 by the ice breaker B. The nature of the machine for breaking these slabs into chunks is not significant, and such a machine is shown in highly diagrammatic form in FIG. 1. The machine illustrated includes a hammer 42, carried by an arm 44 pivoted to a frame at 45. The hammer 42 is lifted and dropped by a rotating eccentric cam 46, that engages the arm 44 and is turned by a motor 47.

As previously mentioned, the frozen chunks E-1 fall into the hammer mill HM, which can be a Fitzpatrick mill conventionally used in processes of this type. The mill provides a hopper 48 for receiving the frozen chunks E-1 and the fineness of the grind or comminuting carried out by the mill can be adjusted as indicated schematically at 49, it being understood that the details of the mechanism for controlling the grind are not critical to the present invention, these being in the prior art.

The ground particles E-2 leaving the Fitzpatrick mill HM are not of uniform size and as previously explained, this presents special problems in the freeze drying of such particles. In the embodiment of the invention being described, the particles E-2 are graded and spread onto the trays T in two layers. The lower layer E-3 is a layer of fines, and the upper layer E-4 is a layer the coarser particles present in the granulated product E-2.

It has been found that the freeze drying problems of fluidizing or vapor-entrainment, aroma loss, premature drying, etc. previously referred to are quite severe when dealing with fines that will pass through a U.S. standard 80 mesh screen. Hence, in this embodiment, the screen 50 mounted beneath the discharge hopper of the hammer mill HM is an 80 mesh screen. As seen in FIG. 2, the screen may be vibrated by the conventional mechanism used in this art, such as an electric vibrator 52 connected to the frame of the screen 50.

The fines E-3 pass through the screen and are received by a hopper 54, which also serves to spread the fines onto a fines feeder conveyor 56 of the endless belt type (FIG. 2). The thickness of the layer of fines E-3 being fed by the belt 56 can be adjusted by a doctor blade or leveling plate 55 which is adjustably secured to the downstream lateral wall of the hopper 54. The means by which plate 55 is adjustably mounted on the hopper for controlling the layer thickness is not critical to the present invention, but the usual slotted hole and capscrew mounting can be used.

The coarser material E-4, retained on the screen 50, slides over a bridge plate 59 into a second hopper 60. The mouth of hopper 60 has a leveling plate 61 like that previously described, and deposits a layer of the coarser granules E-4 onto a second feeder conveyor 62. The feeder conveyors 56, 62 are driven by variable speed gear motors 58, 64, in order that the relative rates of discharge of these devices can be adjusted. The relative rates of feed of the feeder conveyors 56 and 62 will depend largely upon the proportions of fines E-3 and coarser granules E-4 present in the grind. This, in turn, can be adjusted at the Fitzpatrick mill HM by means indicated diagrammatically at 49.

When an 80 mesh screen is employed, the hammer mill HM is usually adjusted so that the percentage of fines E-3 of the total product E-2 is not large, and, in fact, is preferably no more than three or four percent. Thus, the relative thickness of the layers E-3 and E-4 shown in the drawings is exaggerated, for clarity of illustration.

In conventional freeze drying processes, the fines such as the 80 mesh fines E-3 have the undesirable characteristics or properties previously mentioned. In fact, most of these fines may be, in effect, "lost" during the freeze drying operation. They are "lost" by volatilization, degradation scorching, or the like, the net result being that the percentage of fines in the grind E-2 has been considered to represent a corresponding percentage in product loss in the overall process. However, under the system of the present invention, the inclusion of 3 percent or more of fines E-3 that will pass through an 80 mesh screen is acceptable both from a product loss standpoint and from a product quality standpoint. This can be explained in connection with FIG. 3, which is an enlarged fragmentary section taken through a freeze drying chamber and FIG. 3A which is a ten X enlargement in highly diagrammatic form presented merely as illustrative of the type of operation that is believed to take place when freeze drying coffee extract under the present invention.

In FIG. 3 it can be seen how a tray T, having a lower layer of fine E-3 and an upper layer of coarser granules E-4 of frozen extract, is mounted on a heated shelf 24 within the shelf cart by means of insulating feet or bumpers 66. Another heating element 24 is directly above the tray, and the upper heater, in turn, supports a filled tray T. The filled trays T are, as described in the aforesaid Abbott et al. patent, disposed closely adjacent the condenser plates 30 so that water vapor, indicated by the dashed arrows "v," sublimes from the ice cores of the product and flows to the condenser plates 30. The water vapor condenses on the plates to form a thin layer of ice "i," as is well known in the freeze drying art. Also, indicated in FIG. 3 is the heating liquid "h" that is circulated through the heating shelves 24 in the shelf cart. Similarly, a refrigerated liquid "c" is circulated through the condenser plates 30 for removing heat of sublimation from the vapor "v," and hence refreezing the water vapor into the ice "i."

The action that occurs during freeze drying and which eliminates the undesirable characteristics and properties mentioned in the opening statements of this specification, are illustrated in highly diagrammatic form in FIG. 3A. This diagram represents roughly about a ten X fragmentary enlargement through a loaded tray T, wherein at least some of the particles have been screened with an 80 mesh U.S. standard screen. Shown therein is the layer of particles E-3, referred to as fines, beneath a layer E-4 of coarser granules retained on the screen 50, (FIG. 2). Also shown are some intermediate particles indicated at E-4a, these particles being intermediate in size between the fines E-3 and the larger of the particles shown at E-4. Actually, particles such as those in E-4a are usually produced along with particles of still larger size up to the largest particles designated E-4 in the Fitzpatrick, mill. Also, as will be described presently, the particles E-4a, as illustrated in FIG. 3A, are roughly of the size that would pass through a 40 mesh screen, but would remain on an 80 mesh screen, the use of two screens also being contemplated under the present invention.

FIG. 3A shows the condition of the frozen extract during a terminal portion of the drying cycle. The ice cores are indicated at "I" in the Figure, it being understood that drying is not completed until these ice cores are eliminated by sublimation. The only ice cores that can be shown clearly at the scale of FIG. 3A, are the ice cores of the largest particles shown. However, and as indicated in FIG. 3A, ice cores I will also be present throughout most of the drying cycle in all of the particles.

It is this maintenance of ice cores in the various particles of all sizes throughout substantially all of the drying cycle, which prevents the fines E-3 from having the undesirable characteristics and properties previously described in the opening remarks. As before, the water vapor is indicated schematically by the dashed arrows "v." It can be seen in FIG. 3A, that water vapor can flow through the pores of the dried outer shells S of the particles (which are porous) and when the particles are large, the water vapor flows readily into the voids between the particles. Water vapor in the voids can readily find its way from void to void (and also through the particles themselves to a certain extent because of their porosity) and hence will eventually leave the trays, as indicated by the dashed arrows "v" in FIG. 3.

However, the water vapor subliming from the ice cores of the smaller particles or fines E-3 does not have available to it a path as free as that available to vapor subliming from the larger particles. Thus, water vapor emanating from the fines, since it is partially smothered and must diffuse into the overlying layers of granulated product and associated vapor, retards the sublimation action taking place in the ice cores of the fines. This retardation of sublimation from the fines results from the fact that the surrounding pressure at the fines exceeds that surrounding the coarser particles, but in no case is the chamber operated at a vapor pressure high enough to permit melting in the fines.

The result of the retardation mentioned above is that the fines do not dry prematurely, rather their ice cores are reduced in size along with the reduction in size of the ice cores of the larger particles. However, as the larger particles become dryer and dryer and their ice cores shrink in size, and the inherent porosity of the dried larger particles above the fines E-3 offers an increasingly free or nonrestrictive path for the water vapor emanating from the fines. Stated differently, as the ice cores within the larger particles recede, these particles present an ever increasing series of available paths to the water vapor from the fines, so that the vapor pressure over the fines does not rise sufficiently to cause melting at the ice cores of the fines.

Since the drying rates of the various sized particles tend to equalize under the present invention, the fines and the other smaller particles do not dry prematurely and hence do not scorch. As a corollary, the full commercial rate of heat application to the product by the heated shelves 24 can be maintained throughout the drying cycle, without causing premature drying of the fines.

To summarize, elimination of premature drying minimizes the volatilization of aromas from the fines, because the presence of the ice cores in the fines during the drying cycle holds down the temperature of their dried shells. Also, the fines are not entrained or fluidized by the water vapor sublimed from the ice cores, and hence do not fill the voids between the other particles and thereby impede the drying process in general. Nonentrainment of fines by the evolved water vapor also makes it possible to supply heat of sublimation at substantially the same rate as could be employed if no fines were present.

Since the fines retain their ice cores substantially throughout the entire drying cycle and since they are not scorched, the color of the fines remains the desirable dark shade matching the color of the larger particles. As a result of the process of the present invention, even if more than three percent fines pass through the 80 mesh screen and hence pass through the freeze drying cycle, these fines will neither be lost to the system nor will they be discharged in the final product as granules having the undesirable property light color, deficiencies, aroma, etc. previously mentioned.

FIG. 3 illustrates how radiant heat from the upper of the illustrated heated shelves 24, as indicated by the longer wavy arrows, heats the upper layer of particles E-4 directly. The radiant heat emanating from the lower shelf 24, indicated by the short wavy arrows, heats the bottom of the tray T. Thus, the tray T can only heat the layer of fines E-3 by conduction and re-radiation. Since the particles are granular and irregular in shape, they make only point contact with the bottom of the tray so that the heating by conduction is not particularly efficient. Similarly, the tray T is not an efficient reradiator of heat in that it itself is cooled by whatever conduction does take place between it and the fines and other particles in the tray, as well as by re-radiation towards the condenser plates 30. Since the effectiveness of a hot body as a heat radiator is a function of the fourth power of its temperature, this reduces the radiant heat effect from the trays T to the extent wherein the amount of heat received by the layer of fines E-3 is significantly less than that received by direct radiation from the super imposed heating shelves 24. This heating factor further insures that the principles and advantages of the present invention just described are effected.

In the embodiment of the invention being illustrated, the trays T are in the order of 20-40 inches across, and they are spaced by feet 66 (FIG. 3) from the heated shelf 24 that supports them by a distance of about one-eighth to one-fourth of an inch. The tops of the trays T are spaced beneath the superposed heating shelves 24 by a distance substantially equal to the thickness of the trays themselves, in other words by a distance which is in the order of three-fourth to 1 inch.

FIG. 4 shows a modified form of the invention, wherein the granulated product E-2 delivered by the hammer mill HM is deposited in the trays in three layers. In this form the 80 mesh screen 50 and the associated feeder conveyors 56, 52 previously described and shown in FIG. 2 are present as before. However, a 40 mesh U.S. standard screen 50a is interposed between the hopper of the hammer mill HM and the 80 mesh screen 50. This classifies the particles into three layers, namely, the fines E–3 which pass through the 80 mesh screen; medium sized or intermediate particles E–4a (also previously described in connection with FIG. 3A) which are retained on the 80 mesh screen 50 but which pass through the 40 mesh screen 50a; and the larger particles E–4 which are retained on the 40 mesh screen 50a. The medium sized particles E–4a are distributed from the hopper 60 and the feeder conveyor 62 into an intermediate layer E–4a. A baffle plate 59a extending from the 40 mesh screen 50a conducts the particles retained on that screen into an additional hopper 70 having a doctor plate 71, adjustable as before. This hopper deposits the larger particles E–4 onto a feeder conveyor 72 which feeds them as an upper most layer E–4 into the tray T. The action of this modification of the invention is substantially like that previously described and the ice cores of the various products are sublimed due to suppression of water vapor from the smaller particles during the drying cycle, as previously described.

FIG. 5 illustrates still another form of the invention wherein the particles are distributed in somewhat uniform size gradations with the smaller particles being at the bottom of the trays and the larger at the top, throughout the depth of fill. Here, a shaker section X is provided in the tray conveyor 10a at the tray filling zone, in order that the trays may be vibrated sufficiently to cause the particles to settle out in accordance with their size. This takes advantage of the known phenomenon of shaking disparate sized particles, in that the smaller particles gravitate towards the bottom of the trays, those particles of next increasing size settle on top of the smaller particles, etc., with the larger particles disposed at the top of the fill.

The shake section of the belt of the conveyor 10a is deflected down over pulleys 79, around a pair of idler pulleys 80, and back up over pulleys 82. The latter pulleys are mounted on the upper ends of shaker arms 84. The pulleys 82 are interconnected by links 86 to a shaker eccentric 88, rotated by a shaker motor 90. It can thus be seen that the trays can be vigorously vibrated both during and immediately after filling, to cause the particles to settle or gravitate as described. The retardation of sublimation from the ice cores of the smaller particles relative to the sublimation from the particles of larger size, previously described, will be attained in this form of the invention.

EXAMPLE I

Liquid coffee extract containing about 25 percent solids was frozen into slabs about 1 inch thick. The slabs were broken into chunks with a hammer and fed to a Fitzpatrick mill. The mill was set so that about 4 percent, by weight, of the fines produced would pass through a standard U.S. 80 mesh screen.

The fines were evenly distributed on the bottom of trays pre-cooled to a temperature below the eutectic point of the extract, namely to about 20° F.

The coarser particles, retained on the screen were evenly deposited over the layer of fines, filling the trays to a depth of about three-fourths inch.

Before product melting could begin the trays were loaded in a freeze drying chamber and condensable gases exhausted. Radiant heaters at about 300° F. supplied heat directly to the coarser granules of the top layer in the trays, as well as to the tray bottoms. The vapor pressure in the chamber initially reached 500 microns but soon settled down to about 300 microns throughout the majority of the drying cycle, dropping still further near the end. The sublimation drying was continued for about 6 hours, after which the trays were removed from the chamber.

The product had the natural brown color and aroma of freshly ground coffee. Substantially all of the fines had the same color and aroma characteristics as the larger particles. Substantially less than 3 inches by weight of the fines was lighter in color than the other particles and there had been no appreciable loss in fines, thus meeting present commercial goals.

EXAMPLE II

The process given in Example I was followed except that a standard U.S. 40 mesh screen was interposed between the Fitzpatrick mill and the 80 mesh screen. The grind was such that over 10 percent by weight of the particles passed through the 40 mesh screen and over 3 percent passed through the 80 mesh screen.

The appearance of the 80 mesh fines was as before, and the 40 mesh fines likewise had the desired brown color and full aroma.

Although the best mode contemplated for carrying out the present invention has been herein shown and described, it will be apparent that modification and variation may be made without departing from what is regarded to be the subject matter of the invention as set forth in the appended claims.

We claim:

1. Apparatus for converting relatively large frozen bodies of a solids-bearing aqueous liquid food product into a desiccated granular material, comprising means for granulating the frozen bodies into an aggregation of various size frozen particles, support means for the particles, means for forming a level bed of said frozen particles on said support means with the fines at the bottom of the bed, means for supporting the bed in a freeze drying chamber, and means for drying the particles in the bed by sublimation including means for heating the upper stratum of the bed by radiation.

2. The apparatus of claim 1, wherein said bed forming means comprises a screen for separating the larger particles from the fines, means for first spreading the layer of the fines on said support means, and means for depositing the larger particles on the layer of fines.

3. The apparatus of claim 2, wherein said means for depositing the larger particles comprises a second screen for separating the largest particles from these intermediate in size, means for spreading a layer of the intermediate particles on the layer of fines, and means for depositing the largest particles on the layer of intermediate particles.

4. The apparatus of claim 1, wherein said bed forming means comprises means for shaking said particle support means for causing the fines to settle to the bottom of the bed.

* * * * *

PO-1050
(5/69)

UNITED STATES PATENT OFFICE
CERTIFICATE OF CORRECTION

Patent No. 3,648,382          Dated March 14, 1972

Inventor(s) HENRY A. OLDENKAMP & CLYDE D. WATSON

It is certified that error appears in the above-identified patent and that said Letters Patent are hereby corrected as shown below:

Col. 1, line 61, change "articles" to --particles--

Col. 8, line 13, change "inches" to --per cent--

Signed and sealed this 29th day of August 1972.

(SEAL)
Attest:

EDWARD M. FLETCHER, JR.
Attesting Officer

ROBERT GOTTSCHALK
Commissioner of Patents